ated July 7, 1936

UNITED STATES PATENT OFFICE 2,047,087

MATRIX AND COATING COMPOSITION THEREFOR

Raymond Szymanowitz, Hillside, N. J., assignor to Acheson Colloids Corporation, a corporation of New York No Drawing. Application March 23, 1932, Serial No. 600,836

5 Claims. (Cl. 134—1)

The present invention relates to the production of printing matrices, particularly matrices employed in stereotyping operations, and is concerned with coating and/or impregnating compositions adapted for use therefor and the resulting matrices.

An object of the present invention is the provision of compositions adapted to confer upon matrices coated and/or impregnated therewith improved definition or detail of molded subject and easy parting from the cast metal. Other objects of invention include the provision of coated and/or impregnated matrices having improved "stay-back" properties (that is, ability of the mat body to retain sharp impressions), a desirable resistance to charring, and an improved wearability.

I have found that the above, and other, objects of the invention are attained by employing in the production of such matrices coating and/or impregnating compositions (hereinafter more specifically to be described) containing colloidal-graphited water, which compositions may and preferably do contain other components. These compositions are applied to faces of mat bodies by any suitable and well-known coating method such as, for instance, brushing, spraying, applying by means of felt machines, and the like, and the so-coated and/or impregnated mat bodies are thereafter suitably impressed and otherwise processed in known manner and used as casting matrices in accordance with usual practice. The mat bodies to be so treated are constituted by the known sheeted bodies of impressionable fibrous materials of the prior art, including especially tough paper.

The compositions forming a basis of the present invention contain as their essential and common ingredient an aqueous suspension of colloidal graphite, sometimes designated as colloidal-graphited water. For example, such product is available on the market under the trade-mark "Aquadag". While I may treat a face of a mat body with one or more coats of colloidal-graphited water, alone, whereby to confer upon the same the characteristics hereinbefore stated, I prefer to associate with the colloidal-graphited water one or more of the subtances silicate of soda and a conditioning agent such as natural colloidal clay (i. e., bentonite), glycerin, soap, pulverized sugar, flour, or an equivalent or equivalents of the said substances. The conditioning agents in general serve to determine or modify physical properties of the coating composition such as: fluidity, penetration, drying properties, etc.

The "stay-back" properties of the matrices so coated are influenced by the presence and relative proportion of silicate of soda, or an equivalent thereof in the composition, said component conferring stiffness upon the matrix. An undue proportion of silicate of soda tends to make the matrix too brittle for most purposes, and hence the proportion of that component, if and when used in the composition, should be adjusted to the proportions of the other components to effect the relative stiffness desired.

In order to insure retention of moisture in coated matrices it may be desirable, for some classes of work, to use in the composition a hydrating agent such, for instance, as glycerin. The employment of glycerin has been observed to influence the sticking of the casting to the matrix: for this reason it is advisable, when making use of glycerin or an equivalent hydrating agent in the composition, to use also an appreciable amount of silicate of soda, which latter, I have found, is capable of counterbalancing the sticking effect produced by the glycerin.

The relative proportion of colloidal graphite to water in the composition may vary considerably, it being observed that an undue amount of colloidal graphite in the matrix results in a condition wherein some graphite is transferred onto the impression-bearing faces of the first few castings produced therein, whereas an unduly low content of colloidal graphite depreciates the color or shade of matrix.

The invention will be described with greater particularity by reference to the following specific examples of which the 16th and 17th represent my present preferred compositions, it being noted that in said examples the amounts of the ingredients are specified by weight, the glycerin employed was that grade known as "chemically pure" glycerin, the silicate of soda employed was a solution thereof having a strength represented by a specific gravity of from 1.38 to 1.40, and the colloidal-graphited water employed was a colloidal-graphited water containing approximately 22% of graphite, all the graphite being in a colloidal state:

| Example | Composition | Supplementary data |
|---|---|---|
| 1 | 1½ oz. colloidal-graphited water, 10½ oz. water. | Employed 1 to 2 coats. |
| 2 | 1½ oz. colloidal-graphited water, 10½ oz. water, ¾ oz. glycerin | Glycerin used as hydrating agent. |
| 3 | 1½ oz. colloidal-graphited water, 10½ oz. water, ¾ oz. glycerin, 1¾ oz. silicate of soda | Employed 1 coat only. Silicate of soda served as binder for colloidal-graphited water and as a fireproofing agent for the mat. |
| 4 | 1 oz. colloidal-graphited water, 15 oz. water | Employed 1 to 2 coats. |
| 5 | 1 oz. colloidal-graphited water, 15 oz. water, trace of soap | Employed 1 coat only. Soap acted to improve wetting of mat. |
| 6 | 1 oz. colloidal-graphited water, 15 oz. water, 0.8 oz. glycerin | Employed 1 coat only. |
| 7 | 1 oz. colloidal-graphited water, 15 oz. water, 0.8 oz. glycerin, 1 oz. silicate of soda | Employed 1 to 2 coats. |
| 8 | 1 oz. colloidal-graphited water, 15 oz. water, 1 oz. pulverized sugar | Employed 1 coat only. |
| 9 | 1 oz. colloidal-graphited water, 15 oz. water, 1 oz. pulverized sugar, 0.9 oz. glycerin | Employed 1 coat. |
| 10 | 1 oz. colloidal-graphited water, 15 oz. water, 1 oz. pulverized sugar, 0.9 oz. glycerin, 1 oz. silicate of soda | Employed 1 coat. |
| 11 | 1 oz. colloidal-graphited water, 0.5 oz. flour, 15 oz. water | Employed 1 coat. |
| 12 | 2 oz. colloidal-graphited water, 0.5 oz. bentonite water to make 16 oz. | |
| 13 | 2 oz. colloidal-graphited water, 0.5 oz. bentonite water to make 32 oz. | |
| 14 | 2 oz. colloidal-graphited water, 0.5 oz. bentonite, 3.5 oz. silicate of soda water to make 32 oz. | |
| 15 | 2 oz. colloidal-graphited water, 0.5 oz. bentonite, 1.75 oz. silicate of soda water to make 16 oz. | |
| 16 | 2 oz. colloidal-graphited water, 0.5 oz. bentonite, 3.5 oz. silicate of soda water to make 16 oz. | |
| 17 | 5 oz. bentonite, 0.5 oz. casein, 6 oz. silicate of soda, 9 oz. colloidal-graphited water, 68 oz. water. | |

I have found, further, that the admixture of small amounts of colloidal-graphited water to various previously known matrix coating compositions improved the latter in that matrices prepared from mat bodies coated and/or impregnated therewith had improved sharpness of detail and easier parting from the casting.

In the following data are shown the constitutions of other operable compositions which I have made, the parts of the ingredients being parts by weight:

| Example | Colloidal-graphited water | Water | Silicate of soda |
|---|---|---|---|
| 18 | 1 | 8 | |
| 19 | 1 | 12 | |
| 20 | 1 | 16 | |
| 21 | 1 | 20 | |
| 22 | 1 | 24 | |
| 23 | 1 | 28 | |
| 24 | 1 | 8 | 1 |
| 25 | 1 | 12 | 1.5 |
| 26 | 1 | 16 | 2 |
| 27 | 1 | 20 | 2.5 |
| 28 | 1 | 24 | 3 |
| 29 | 1 | 28 | 3.5 |
| 30 | 1 | 16 | 0.25 |
| 31 | 1 | 16 | 0.75 |
| 32 | 1 | 16 | 1.25 |
| 33 | 1 | 16 | 1.75 |
| 34 | 1 | 16 | 2.25 |
| 35 | 1 | 16 | 2.75 |

It is noted that in experiments numbers 23 and 35 single coatings and double coatings were employed, and that in experiment number 29 from 1 to 3 coats were employed. It will be noted also that in the series of experiments numbered 24 to 29, inclusive, the ratio of silicate of soda to water remained constant but the colloidal graphite content was progressively decreased by dilution.

It is to be understood that to the compositions above generically and specifically described I may add a suitable thickening agent, such as casein, gum arabic, or the like. As will be appreciated by one skilled in this art, the more viscous compositions, such as are obtained by adding suitable amounts of proper thickening agents to any of the formulae herein described, are easier to apply with certain types of coating equipment, such as, for instance, felt machines.

I claim:

1. Matrix coating composition consisting essentially of a suspension of colloidal graphite in water and silicate of soda as a binder for the colloidal graphite, there being present in the composition from about 1.25 to about 17.5 parts of silicate of soda and from about 25 to about 140 parts of water for each part by weight of solid colloidal graphite.

2. Matrix coating composition as defined in claim 13, in which a colloidal clay is present in the composition in the proportion of from about 1.25 to 2.75 parts by weight of the clay to each part of solid colloidal graphite.

3. Matrix coating composition consisting essentially of the following ingredients in the following amounts by weight:

|  | Ounces |
|---|---|
| Aqueous suspension of colloidal graphite in water—solid colloidal graphite content=22% | 1.0 |
| Silicate of soda | about 1.0 |
| Water | about 8.0 |

4. An article of manufacture comprising a fibrous matrix board for stereotyping containing in the interstices of and on a surface of the board a composition comprising colloidal graphite and silicate of soda as a binder.

5. An article of manufacture comprising a fibrous matrix board for stereotyping containing in the interstices of and on a surface of the board a composition comprising colloidal graphite, a minor amount of a colloidal clay, and silicate of soda as a binder.

RAYMOND SZYMANOWITZ.

CERTIFICATE OF CORRECTION.

Patent No. 2,047,087.                                                July 7, 1936.

RAYMOND SZYMANOWITZ.

It is hereby certified that error appears in the printed specification of the above numbered patent requiring correction as follows: Page 2, second column, line 31, claim 2, for the claim reference numeral "13" read 1; and that the said Letters Patent should be read with this correction therein that the same may conform to the record of the case in the Patent Office.

Signed and sealed this 8th day of September, A. D. 1936.

Leslie Frazer (Seal)                                      Acting Commissioner of Patents.